United States Patent
Kang et al.

(10) Patent No.: US 12,480,758 B2
(45) Date of Patent: Nov. 25, 2025

(54) METHOD AND DEVICE FOR MEASURING HEIGHT OF POUCH CUP PORTION ACCOMMODATING ELECTRODE ASSEMBLY

(71) Applicant: LG Energy Solution, Ltd., Seoul (KR)

(72) Inventors: Daehyung Kang, Daejeon (KR); Heongi Seok, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 12 days.

(21) Appl. No.: 18/276,155

(22) PCT Filed: Oct. 27, 2022

(86) PCT No.: PCT/KR2022/016582
§ 371 (c)(1),
(2) Date: Aug. 7, 2023

(87) PCT Pub. No.: WO2023/080543
PCT Pub. Date: May 11, 2023

(65) Prior Publication Data
US 2024/0133677 A1    Apr. 25, 2024

(30) Foreign Application Priority Data
Nov. 3, 2021   (KR) .................. 10-2021-0149899

(51) Int. Cl.
*G01B 11/06* (2006.01)
*G01B 5/00* (2006.01)
(Continued)

(52) U.S. Cl.
CPC ........ *G01B 11/0608* (2013.01); *G01B 5/0004* (2013.01); *H01M 10/0404* (2013.01); *H01M 50/105* (2021.01)

(58) Field of Classification Search
CPC ............. G01B 11/0608; G01B 5/0004; H01M 50/105; H01M 10/0404
See application file for complete search history.

(56) References Cited

U.S. PATENT DOCUMENTS

2013/0034796 A1   2/2013  Hata
2020/0331187 A1  10/2020  Suh et al.

FOREIGN PATENT DOCUMENTS

| CN | 103900448 A | 7/2014 |
| CN | 204461301 U | 7/2015 |

(Continued)

OTHER PUBLICATIONS

Extended European Search Report including Written Opinion for Application No. 22890278.9 dated Sep. 2, 2024. 5 pgs.
(Continued)

*Primary Examiner* — Michelle M Iacoletti
*Assistant Examiner* — Jarreas Underwood
(74) *Attorney, Agent, or Firm* — Lerner David LLP

(57) ABSTRACT

Disclosed are a method and apparatus for measuring a height of a pouch cup portion that accommodates an electrode assembly, which can improve the quality of a pouch by minimizing measurement deviations between measurers to improve the reliability for the height measurement of the pouch cup portion. The method for measuring the height of the pouch cup portion is a method for measuring a height of a pouch cup portion of a pouch case for a secondary battery, the method including the steps of: (a) covering a cup portion support jig with a pouch; (b) positioning an upper fixing jig to expose a corner portion for measuring a height of the cup portion in a pouch upper surface covered on the cup portion support jig, and to cover a periphery of the exposed corner; (c) positioning a lower fixing jig at a pouch wing portion and a peripheral bottom portion of a lower corner portion corresponding to the corner portion to expose the periphery (Continued)

of the lower corner portion and cover other portions; and (d) measuring the cup portion height of the corner portion exposed by the upper fixing jig and the lower fixing jig through a 3D shape measurer.

20 Claims, 5 Drawing Sheets

(51) Int. Cl.
*H01M 10/04* (2006.01)
*H01M 50/105* (2021.01)

(56) References Cited

FOREIGN PATENT DOCUMENTS

| CN | 218410960 U | * | 1/2023 | |
|---|---|---|---|---|
| EP | 3667797 A1 | | 6/2020 | |
| JP | H05196423 A | | 8/1993 | |
| JP | 2007237667 A | | 9/2007 | |
| JP | 4833376 B2 | | 12/2011 | |
| JP | 2017030239 A | | 2/2017 | |
| KR | 101456424 B1 | | 10/2014 | |
| KR | 20150026172 A | * | 3/2015 | ............. G01B 17/02 |
| KR | 20150106586 A | | 9/2015 | |
| KR | 20170142050 A | * | 12/2017 | ............... G01B 5/18 |
| KR | 20190074496 A | | 6/2019 | |
| KR | 20190105765 A | | 9/2019 | |
| KR | 102111454 B1 | | 5/2020 | |
| KR | 102187988 B1 | | 12/2020 | |
| KR | 102193564 B1 | | 12/2020 | |

OTHER PUBLICATIONS

International Search Report for PCT/KR2022/016582 mailed Feb. 8, 2023. 4 pages.

* cited by examiner

[Figure 1]
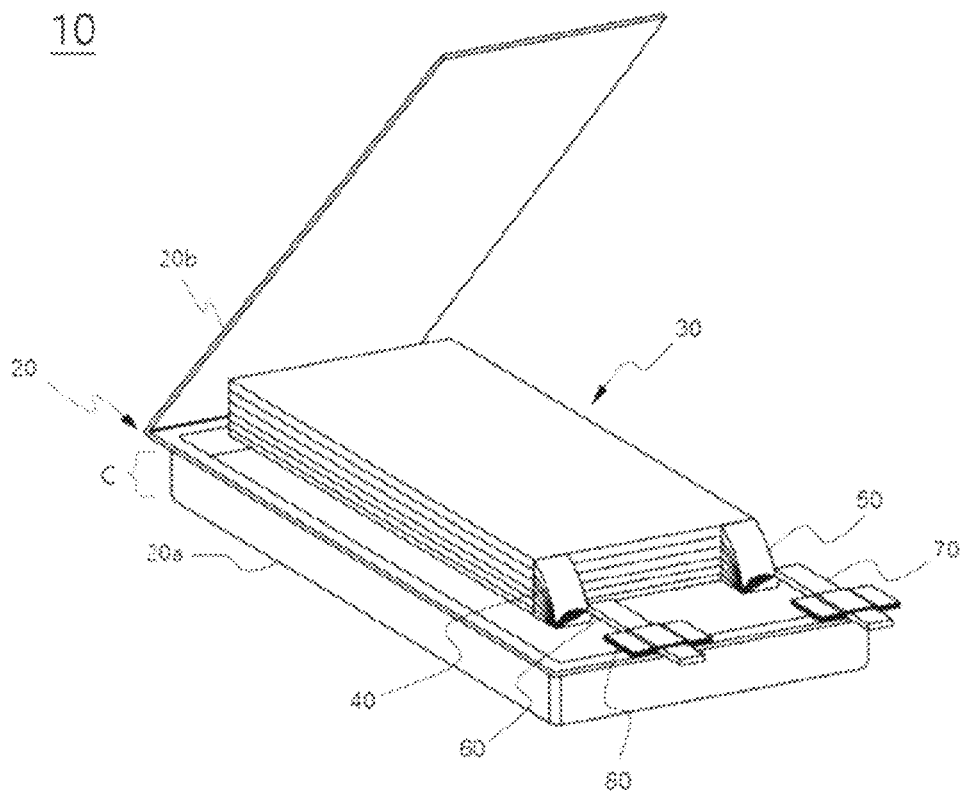
[Figure 2]
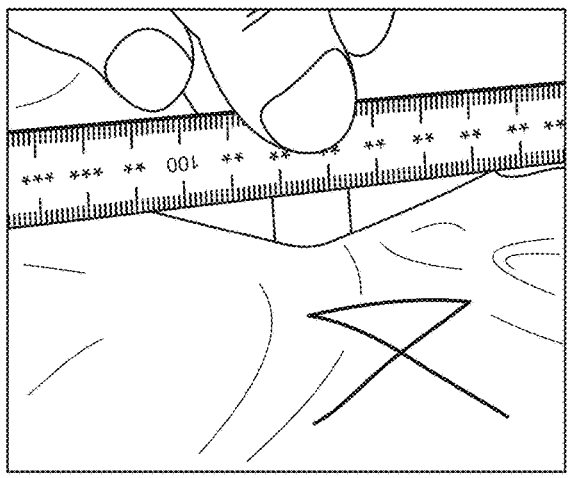
(a)
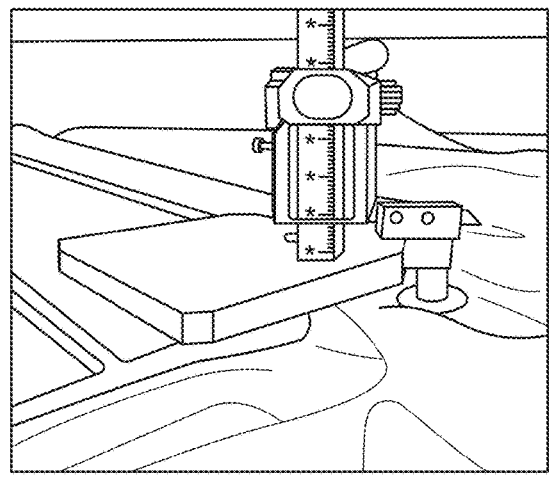
(b)

[Figure 3]
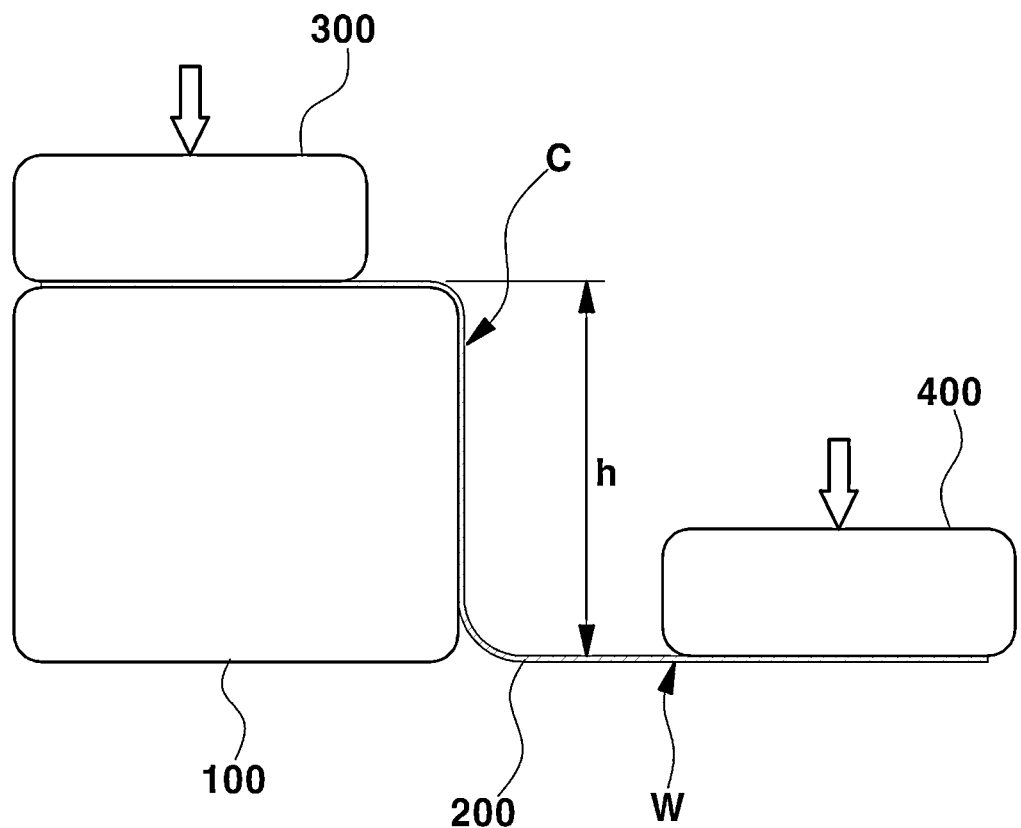

【Figure 4】
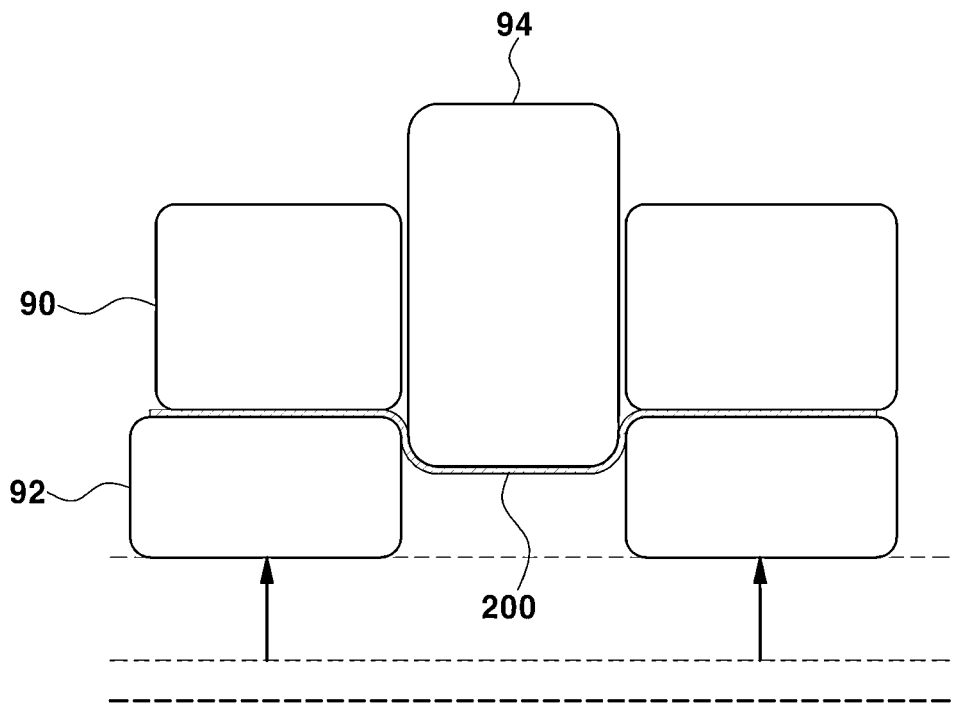
【Figure 5】
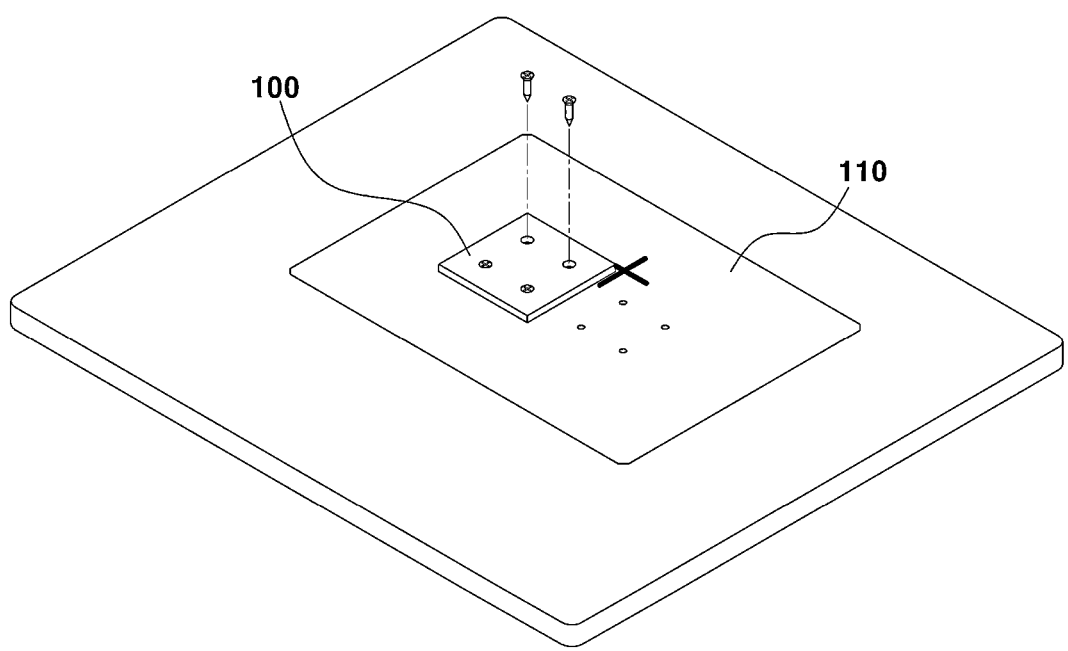

【Figure 6】
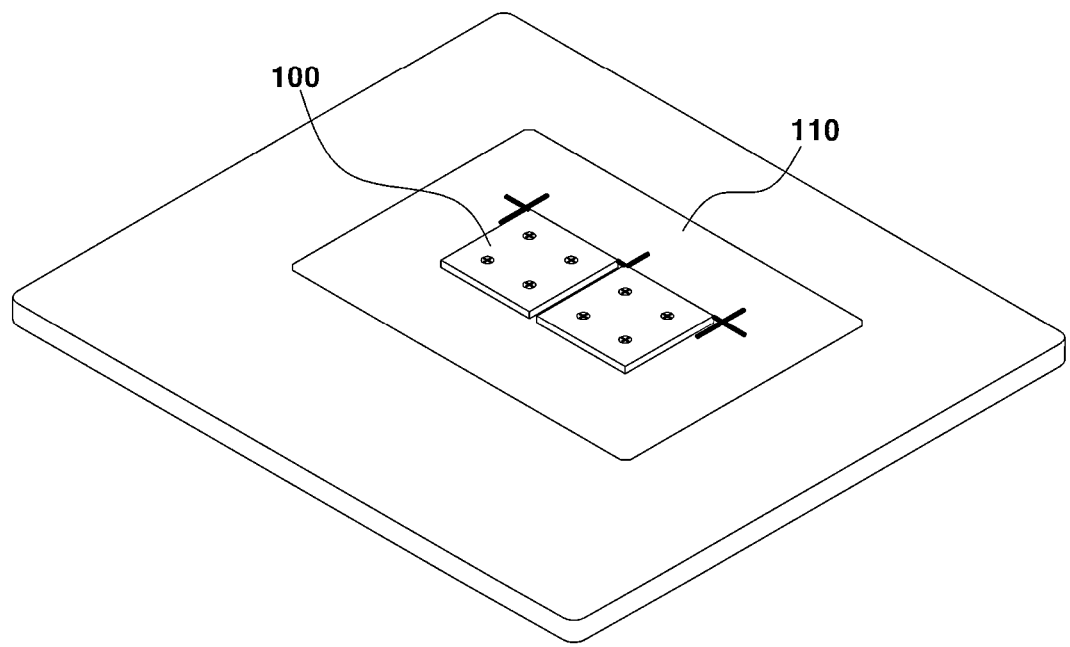
【Figure 7】
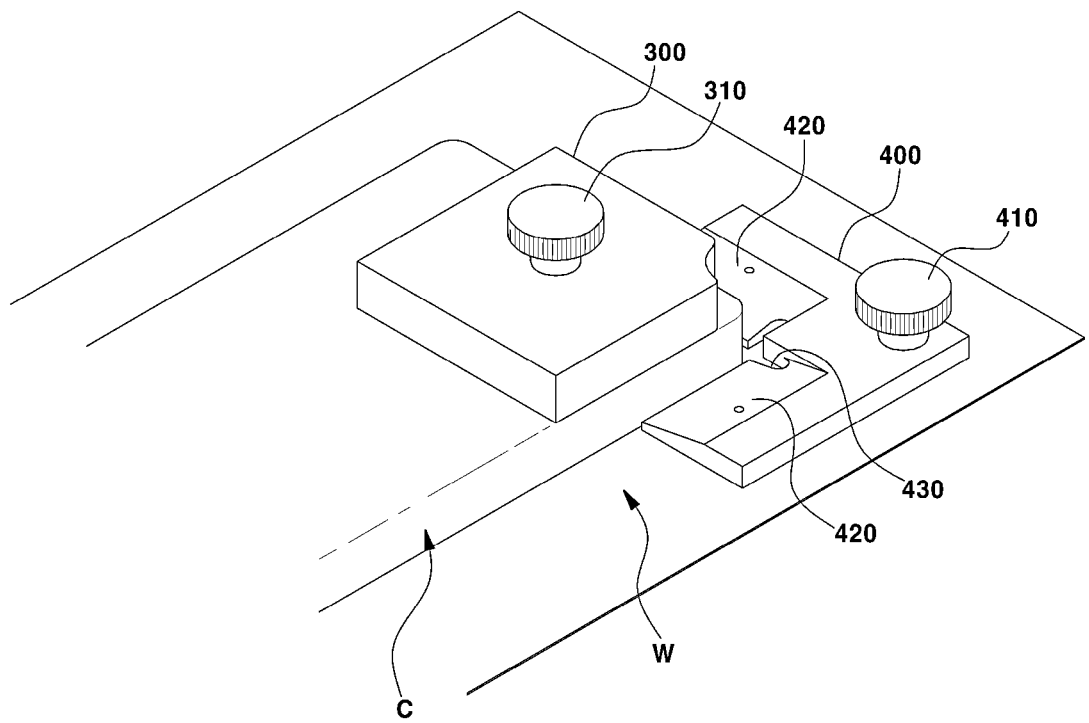

[Figure 8]
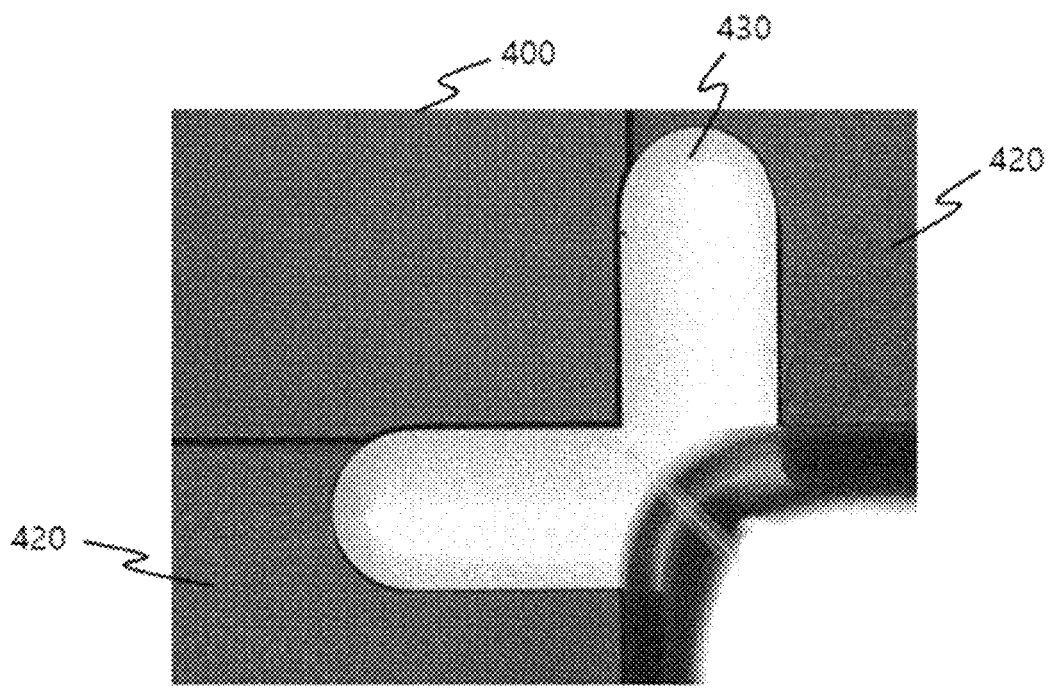

METHOD AND DEVICE FOR MEASURING HEIGHT OF POUCH CUP PORTION ACCOMMODATING ELECTRODE ASSEMBLY

CROSS-REFERENCE TO RELATED APPLICATIONS

The present application is a national phase entry under 35 U.S.C. § 371 of International Application No. PCT/KR2022/016582 filed Oct. 27, 2022, which claims priority from Korean Patent Application No. 10-2021-0149899 filed Nov. 3, 2021, all of which are incorporated herein by reference.

TECHNICAL FIELD

The present invention relates to a method and apparatus for measuring a height of a pouch cup portion that accommodates an electrode assembly in a non-contact measurement manner, and more specifically, to a method and apparatus for measuring the height of a pouch cup portion that accommodates an electrode assembly capable of improving the quality of the pouch by minimizing a measurement deviation between measurers to improve reliability for the height measurement of the pouch cup portion.

BACKGROUND ART

With explosive increases in technological development and demand for mobile devices and automobiles, more research is being conducted on secondary batteries with high energy density, discharge voltage and excellent output stability. Examples of such secondary batteries may include lithium secondary batteries such as a lithium-sulfur battery, a lithium ion battery, and a lithium ion polymer battery. In addition, such secondary batteries can be classified into a cylindrical type, a prismatic type, a pouch type and the like depending on their shape, and among them, interest in and demand for a pouch type battery cell are gradually increasing. The pouch type battery cells can be stacked with a high degree of integration, have a high energy density per unit weight, are inexpensive, and are easily deformable. Therefore, the pouch type battery cell can be manufactured in shapes and sizes applicable to various mobile devices and vehicles.

FIG. 1 is an exploded perspective view of a conventional pouch type battery cell. Referring to FIG. 1, the conventional pouch type battery cell 10 includes an electrode assembly 30, electrode tabs 40 and 50 extending from the electrode assembly 30, electrode leads 60 and 70 welded to the electrode tabs 40 and 50, and a battery case 20 that accommodates the electrode assembly 30. The electrode assembly 30 has a stack type or a stack/folding type structure, in which a positive electrode and a negative electrode are sequentially stacked with a separator interposed therebetween. The electrode tabs 40 and 50 extend from each electrode plate of the electrode assembly 30, and the electrode leads 60 and 70 are electrically connected to a plurality of electrode tabs 40 and 50 extending from each electrode plate, respectively, and a part thereof is exposed to the outside of the battery case 20. Moreover, an insulating film 80 can be attached to a part of the upper and lower surfaces of the electrode leads 60 and 70 to increase the degree of sealing with the battery case 20 and simultaneously to secure an electrical insulation state. The battery case 20 is generally made of a laminated sheet including resin, metal, or a mixture thereof, provides a space capable of accommodating the electrode assembly 30, and has a pouch shape as a whole. In the case of a stack type electrode assembly 30 as shown in FIG. 1, the inner upper end of the battery case 20 can be separated from the electrode assembly 30 so that the plurality of positive electrode tabs 40 and the plurality of negative electrode tabs 50 can be coupled together to the electrode leads 60 and 70.

That is to say, the conventional pouch type battery cell has a sealing structure in which an electrode assembly including a positive electrode, a negative electrode, and a separator is stacked and accommodated in a flexible battery case (i.e., a stack type electrode assembly or a stack/folding type electrode assembly is accommodated in the battery case), and an end of the battery case is sealed by heat sealing. A flexible packaging material sheet constituting the battery case is made of at least one of a resin layer and a metal layer, and by forming a sealing part at the end thereof, not only prevents the electrode assembly from deviating to the outside, but also serves to protect the electrode assembly from external impact. That is, the pouch type battery cell may be manufactured by going through the steps of accommodating the electrode assembly in a battery case (or a pouch cup portion), injecting an electrolytic solution, and then sealing by heat sealing or the like.

Referring back to FIG. 1, the battery case 20 of the pouch type battery cell 10 can be divided into a case 20a for accommodating the electrode assembly 30, and a cover 20b for covering the case so that the electrode assembly 30 is not deviated after the electrode assembly 30 is accommodated in the case. Here, a symbol C notated on the case 20a of FIG. 1 is a portion in which the electrode assembly 30 is completely accommodated, which can be said to be a portion where only the seal portion (or a wing portion) is excluded from the case 20a. In addition, the portion corresponding to the symbol C of FIG. 1 will be named hereinafter a "pouch cup portion" in consideration of having a shape similar to a cup.

On the other hand, such a pouch cup portion can be formed using a punch or the like. After that, the height (or depth) of the cup portion of the pouch in which the cup portion is formed is measured, and when it is confirmed that the cup portion is formed at an appropriate height, an assembly process such as embedding the electrode assembly into the cup portion of the pouch can be performed. In other words, the height of the pouch cup portion and its management are especially very important in inserting the electrode assembly into the pouch cup portion.

In order to perform such a process, in this technical field, the cup portion height of the pouch having the cup portion formed thereon is measured through a contact type measuring mechanism such as a steel ruler or Vernier Calipers. FIG. 2 shows an aspect which measures the height of the pouch cup portion through a conventional contact type measuring mechanism. FIG. 2a corresponds to the steel ruler measuring method, and FIG. 2b corresponds to the Vernier Calipers measuring method. When the steel ruler measuring method is used, two steel rulers can be used, and when the Vernier Calipers measuring method is used, the vertically fixed Vernier Calipers is lowered and brought into contact with the measurement unit to perform measurement.

However, in these cases, subjective judgment of the person who measures (or a measurer) has to be intervened. A problem of low reliability level on the height measurement of the pouch cup portion inevitably occurs. Therefore, when the height of the pouch cup portion is measured through the conventional contact type measuring mechanism, the pouch cup portion does not completely meet the standards of the electrode assembly, a problem of a degradation in the quality of the pouch such as cracks inevitably occur.

Therefore, there is a demand for a technology that can improve the quality of pouch, by objectively measuring the height of the pouch cup portion without probability of intervention of the subjective judgment of the measurer, and enhancing the overall reliability of measurement values such as accuracy, repeatability, and reproducibility compared to the related art.

DISCLOSURE

Technical Problem

Accordingly, an object of the present invention is to provide a method and apparatus for measuring the height of a pouch cup portion for accommodating an electrode assembly, which can improve the quality of a pouch by minimizing inter-measurer measurement deviations to improve the reliability for the height measurement of the pouch cup portion.

Technical Solution

In order to achieve the above object, the present invention provides a method for measuring a height of a pouch cup portion of a pouch case for a secondary battery, the method including the steps of: (a) covering a cup portion support jig with a pouch; (b) positioning an upper fixing jig to expose a corner portion for measuring a height of the cup portion in a pouch upper surface covered on the cup portion support jig, and to cover a periphery of the exposed corner; (c) positioning a lower fixing jig at a pouch wing portion and a peripheral bottom portion of a lower corner portion corresponding to the corner portion to expose the periphery of the lower corner portion and cover other portions; and (d) measuring the cup portion height of the corner portion exposed by the upper fixing jig and the lower fixing jig through a 3D shape measurer.

The present invention also provides an apparatus for measuring a height of a pouch cup portion of a pouch case for a secondary battery, the apparatus including: a cup portion support jig having an internal shape of the pouch cup portion so that the pouch cup portion can be covered; a plate-shaped upper fixing jig which exposes a corner portion for measuring the height of the cup portion in a pouch upper surface covered on the cup portion support jig, and covers a peripheral portion of the exposed corner portion; a plate-shaped lower fixing jig that covers a pouch wing portion and a peripheral bottom portion of a lower corner portion corresponding to the corner portion, and exposes the periphery of the lower corner portion to enable measuring the height of the cup portion; and a 3D shape measurer that measures the height of the corner portion.

Advantageous Effects

According to the method and apparatus for measuring the height of a pouch cup portion that accommodates an electrode assembly according to the present invention, there is an advantage capable of improving the quality of pouches, by minimizing inter-measurer measurement deviations to improve the reliability for the height measurement of a pouch cup portion.

DESCRIPTION OF DRAWINGS

FIG. 1 is an exploded perspective view of a conventional pouch type battery cell.

FIG. 2 shows an aspect in which the height of the pouch cup portion is measured through a conventional contact type measuring mechanism.

FIG. 3 is a schematic diagram showing an aspect in which an apparatus for measuring the height of the pouch cup portion is provided according to an embodiment of the present invention.

FIG. 4 is a schematic diagram showing an aspect in which the cup portion is formed in the pouch before molding.

FIG. 5 is a perspective view showing an aspect in which cup portion support jigs are provided and fixed on a separate pedestal according to another embodiment of the present invention.

FIG. 6 is a perspective view showing an aspect in which two cup portion support jigs are provided and fixed on a separate pedestal according to still another embodiment of the present invention.

FIG. 7 is an upper perspective view showing an aspect in which a pouch covered with the cup portion support jig is pressed and fixed by an upper fixing jig, and pouch wing portions are pressed and fixed by a lower fixing jig, according to an embodiment of the present invention.

FIG. 8 is an image in which a plurality of profile measurement lines are set in the direction from a corner side of the cup portion of the upper fixing jig to the side of the lower fixing jig through captured images obtained through a laser emitted from a 3D shape measurer and a camera of the 3D shape measurer.

BEST MODE

The present invention will now be described in detail with reference to the accompanying drawings.

FIG. 3 is a schematic diagram showing an aspect in which an apparatus for measuring the height of the pouch cup portion is provided according to an embodiment of the present invention. Referring to FIG. 3, the method for measuring the height of the pouch cup portion that accommodates the electrode assembly according to the present invention is a method for measuring the height of a pouch cup portion C of a pouch case for a secondary battery (for example, a method for inserting and fixing each of both ends of the pouch between a stripper and a die, and then, measuring a height of the pouch cup portion C formed by pressing a central portion of the pouch with a punch), the method including the steps of (a) covering the cup portion support jig 100 with the pouch 200, (b) positioning the upper fixing jig 300 to expose a corner portion for measuring the height of the cup portion C in the upper surface of the pouch 200 covered on the cup portion support jig 100, and to cover the periphery of the exposed corner, (c) positioning a lower fixing jig 400 on a pouch wing portion W and a peripheral bottom portion of the lower corner portion corresponding to the corner portion to expose the periphery of the lower corner portion and cover other portions, and (d) measuring a cup portion height h of the corner portion exposed by the upper fixing jig and the lower fixing jig through a 3D shape measurer.

Usually, the pouch cup portion may be formed by molding with a punch or the like. FIG. 4 is a schematic diagram showing an aspect in which the cup portion is formed in the pouch before molding. As shown in FIG. 4, after each of both ends of the pouch 200 is inserted and fixed between the stripper 90 and the die 92, the central portion of the pouch 200 is pressed by the punch 94, and at the same time the stripper 90 and the die 92 on both sides of the pouch 200 are raised to form a cup portion in the pouch. After that, the cup portion height (or depth) of the pouch in which the cup portion is formed is measured, and in this case, when the cup portion is confirmed to be formed at an appropriate height, an assembly process of embedding the electrode assembly inside the pouch cup portion may be performed. In other words, when inserting the electrode assembly into the pouch cup portion, especially the height of the pouch cup portion and its management are very important.

To perform such a process, in the relevant art, the cup portion height of the pouch having the cup portion formed thereon is measured through a contact type measuring mechanism such as a steel ruler or a Vernier Calipers, as shown in FIG. 2. However, in these cases, the subjective judgment of the person who measures (or a measurer) inevitably intervened, and accordingly, due to the measurement deviation between the measurers, a problem inevitably occurs that the level of reliability for the height measurement of the pouch cup portion is lowered. Therefore, when the height of the pouch cup portion is measured through the conventional contact type measuring mechanism, since the pouch cup portion does not completely meet the specifications of the electrode assembly, which inevitably causes a problem of degrading the quality of pouch such as a crack (in particular, when the pouch cup portion is smaller than the electrode assembly, cracks occur).

Therefore, the present applicant invented a technique that can improve the quality of the pouch by objectively measuring the height of the pouch cup portion without probability of intervention of the subjective judgment of the measurer, and thus enhancing the overall reliability for the measurement values such as accuracy, repeatability, and reproducibility compared to the related art.

When describing the present invention with reference to FIGS. 3 and 4, in order to measure the height of the pouch cup portion according to the present invention, a preceding process of forming the cup portion in the pouch through a molding method as shown in FIG. 4 needs to be necessarily performed. After that, a step of covering the cup portion support jig 100 with the pouch 200, that is, a step of covering the cup portion support jig 100 having the shape of the formed pouch cup portion C with the pouch 200 to accommodate the cup portion support jig 100 in the cup portion C of the pouch 200 is performed (step a). Since the cup portion support jig 100 is for maintaining the shape of the cup portion C of the pouch 200, it needs to have the same shape as the pouch cup portion C, and therefore it is good to have as little error as possible.

FIG. 5 is a perspective view showing an aspect in which a cup portion support jig is provided and fixed on a separate pedestal according to another embodiment of the present invention. As shown in FIG. 5, the cup portion support jig 100 may be provided on a separate pedestal 110. This is for fixing the cup portion support jig 100 to improve convenience of attaching the pouch, and as shown in FIG. 5, the cup portion support jig 100 and the pedestal 110 may be fastened and fixed with a member such as a screw or a pin through holes formed on each of them. At this time, the pedestal 110 may be in a state of being placed on the die, and if necessary, members such as screws and pins may pass through the die to further improve the fixing force. Also, any one of the cup portion support jig 100 and the pedestal 110 may be provided with a magnet, and the other is made of a material such as steel to which a magnet can be attached, and thus may be attached and fixed to each other.

That is, when the cup portion height measurement of any one corner portion is completed through the method for measuring the height of the pouch cup portion C, the cup portion heights of the remaining three corner portions may be sequentially measured. In this case, the pouch 200 or the cup portion support jig 100 can be rotated by 90 degrees, 180 degrees or 270 degrees to measure the height of the other corners of the cup portion. After the cup portion support jig 100 is completely rotated by 90 degrees, 180 degrees or 270 degrees on the pedestal 110, it is fastened to the pedestal 110 with a screw member or a pin member or attached through magnetic coupling, and thus the corner height of the pouch cup portion C may be sequentially measured while turning it.

On the other hand, in FIG. 5, one side corner portion of the cup portion support jig 100 is marked with a virtual cross, and an intersection of the cross corresponds to the camera center point or measurement point of the 3D shape measurer used when measuring the height of the pouch cup portion. Therefore, as shown in FIG. 5, when the cup portion support jig 100 is fixed and positioned on any one side (left side or right side) of the pedestal 110 on the basis of the cross center point, even if the measuring part of the cup portion is changed (that is, even if the pouch or the cup portion support jig 100 is rotated by 90 degrees (°), 180 degrees, or 270 degrees on the pedestal 110), there is an advantage that it is possible to measure the height of the cup portion C immediately, without moving the pedestal 110 to the X and Y axes. Also, after measuring the height of the cup portion C of the corner portion through the 3D shape measurer, the measured value is macro-calculated to determine the height h of the pouch cup portion C. However, when following the above method, since a user does not need to additionally set macros, there is also an advantage capable of minimizing variations in height measurements of the pouch cup portion. Therefore, it is preferable that the cup portion support jig 100 and the pedestal 110 are installed to be fixed to each other in alignment with the camera center point of the 3D shape measurer or the measurement point.

However, when the height measurement of the cup portion C at one of the corners is completed through the method for measuring the height of the pouch cup portion, the 3D shape measurer is positioned on the other corner side of the cup portion C, and the height of other corners of the cup portion C that is not measured may also be sequentially measured.

FIG. 6 is a perspective view showing an aspect in which two cup portion support jigs are provided and fixed on a separate pedestal according to still another embodiment of the present invention. This is for measuring the height of the cup portion of the model in which two cup portions are formed in one pouch, and a pouch model in which two cup portions are formed has a specification greater than a pouch model in which one cup portion is formed, and this is to compensate the problem that the pouch or the cup portion support jig 100 cannot be rotated by 90 degrees, 180 degrees, or 270 degrees on the pedestal 110. Therefore, when using two cup portion support jigs, it is possible to measure the height of the pouch cup portion without rotating the pouch or the cup portion support jig 100 by further placing the camera center point of the 3D shape measurer or the measurement point on the outer corner portion of each of two cup portion support jigs, in addition to the central portion of the pedestal 110 (that is, the corner portion in which the two cup portion support jigs face each other). That is to say, when measuring the cup portion height of a pouch in which two cup portions are formed, the cup portion support jig 100 is accommodated in each of the two cup portions C, and at this time, it is possible to measure the height of the pouch cup portion C having the corner portion, in which the two cup portion support jigs 100 face each other, and the outer corner portions of each of the cup portion support jigs 100 without rotating the pouch 200 or the cup portion support jig 100.

On the other hand, when there is a difference between the height of the cup portion C of the molded pouch 200 and the height of the cup portion support jig 100, a height adjusting liner plate (not shown) may be inserted to face the upper surface or the lower surface of the cup portion support jig 100. Holes that can be formed in the cup portion support jig 100 and the pedestal 110 may also be formed even in the height adjusting liner plate, and mutual fastening is possible using the member such as screws and pins. In addition, attachment using magnetic force is also possible.

As described above, after the cup portion support jig 100 is covered with the pouch 200, a step of positioning the upper fixing jig 300 to expose the corner portion of the upper surface of the pouch 200 covered with the cup portion support jig 100 for measuring the height of the cup portion C, and cover the periphery of the exposed corner to press and fix the pouch 200 covered with the cup portion support jig 100 is performed (step b). Subsequently, a step of positioning the lower fixing jig 400 on the porch wing portion W of the lower corner portion corresponding to the corner portion and on the peripheral bottom portion, exposing the periphery of the lower corner portion, and covering other portions, and at the same time pressing and fixing the pouch wing portion W and the peripheral bottom portion is performed (step c).

FIG. 7 is an upper perspective view showing an aspect in which the pouch covered with the cup portion support jig is pressed and fixed by the upper fixing jig, and the pouch wing portion is pressed and fixed by the lower fixing jig, according to an embodiment of the present invention. After the cup portion support jig 100 covered with the pouch 200 as described above, as shown in FIG. 3 or 7, the upper fixing jig 300 is positioned over the cup portion C of the pouch 200 to press and fix the pouch 200, and the lower fixing jig 400 is positioned over the pouch wing portion W and the peripheral bottom portion to press and fix the pouch wing portion W.

Therefore, any one of the upper fixing jig 300 and the cup portion support jig 100 may be provided with a magnet, the other thereof is made of a material such as steel to which the magnet can be attached, and thus both of them may be attached to each other, and through this, the pouch 200 interposed between the upper fixing jig 300 and the cup portion support jig 100, more specifically, the cup portion C of the pouch 200 may be fixed. In addition, the lower fixing jig 400 may be magnetically attached to the bottom surface, or the pouch wing portion W interposed between the lower fixing jig 400 and the bottom surface may be fixed through screwing to the bottom surface. That is, each of the upper fixing jig 300 and the lower fixing jig 400 may fix the pouch 200 by magnetic force or the like. In addition, when the pedestal 110 as described above is used, the lower fixing jig 400 also can be fixed to the pedestal 110 in the same manner as the cup portion support jig 100, and in this case, the pouch wing portion W may be fixed by being interposed between the lower fixing jig 400 and the pedestal 110.

On the other hand, when the measurement of the height of one end of the intended pouch cup portion C is completed, and thus the cup portion support jig 100 needs to be rotated or the pouch 200 needs to be separated from the cup portion support jig 100, the upper fixing jig 300 and the lower fixing jig 400 need to be separated from the pouch 200. At this time, since the upper fixing jig 300 is magnetically coupled to the cup portion support jig 100, the separation is not easy.

Therefore, in this case, as shown in FIG. 7, a upper fixing jig knob 310 may be fixed and coupled to one end of the upper surface of the upper fixing jig 300, thereby more easily detaching the upper fixing jig 300. Further, even if the lower fixing jig 400 is magnetically coupled to the pedestal 110, a lower fixing jig knob 410 may be fixedly coupled to one end of the upper surface of the lower fixing jig 400, thereby more easily detaching the lower fixing jig 400.

On the other hand, the upper fixing jig 300 and the lower fixing jig 400 preferably have a color with brightness of 5 or less to reduce the reflection of the laser emitted by the 3D shape measurer. As the color having brightness of 5 or less, black or a color close thereto is preferable. This is to compensate for the problem in that the measurement of height h of the cup portion C of the pouch may be inaccurate by reflecting a laser emitted by the 3D shape measurer due to the characteristics of the pouch including a material such as aluminum.

After fixing the pouch 200 by installing each of the upper fixing jig 300 and the lower fixing jig 400 as described above, a step of measuring the cup portion height h of the corner portion exposed by the upper fixing jig 300 and the lower fixing jig 400 through a 3D shape measurer is performed (step d). The 3D shape measurer is used to measure the height of the pouch cup portion. After particular positions of the pouch cup portion C to be measured are set as a measurement point or a camera center point of the 3D shape measurer, by emitting the laser from the 3D shape measurer, the cup portion height h of the corner portion exposed by the upper fixing jig 300 and the lower fixing jig 400 may be measured. That is to say, the one side corner portion height h between an interface between the upper fixing jig 300 and the cup portion support fixing jig 100 and an interface between the lower fixing jig 400 and the bottom surface may be measured.

The position of the pouch cup portion C measured through the 3D shape measurer is preferably a corner portion in which the shape of the pouch cup portion C is best maintained, specifically, it may be a corner portion in a height direction that connects one vertex and a vertex facing this. That is, it is preferable to set the intersection point of the cross notation shown in FIG. 5 or 6 as the measurement point or the camera center point of the 3D shape measurer. Further, as described above, when measurement of the height of any one of the pouch cup portions is completed, the pouch or the cup portion support jig 100 is rotated by 90 degrees, 180 degrees or 270 degrees, and the other corner portion height of the pouch cup portion C to be measured may be sequentially measured. Moreover, in the case of a pouch model in which two cup portions are formed, since it is not easy to rotate the pouch or the cup portion support jig 100, at this time, the 3D shape measurer may be moved to left and right to measure the height of the cup portion C at a plurality of locations. In addition, when measuring the cup portion height of a pouch model in which two cup portions are formed, one cup portion support jig 100 may be accommodated in each of the cup portions, and the individual cup portion support jig 100 may also be accommodated for each corner.

As described above, it is most preferable from the viewpoint of reliability to set a corner portion in the height direction that connects one vertex of the pouch cup portion C and the vertex facing it as a measurement point. Accordingly, the corner portion of the pouch cup portion C to be measured and its peripheral portion need to be fixed with a stronger force. For this purpose, as shown in FIG. 7, the upper fixing jig 300 may be in close contact with one side corner of the pouch cup portion C to be measured as much as possible, and the lower fixing jig 400 may be provided in the form that simultaneously wraps two side surfaces adjacent to one side corner of the pouch cup portion C. As an example, the lower fixing jig 400 may have a letter "]" shape including two wing portions, and in this case, the two wing portions may be provided in the form that simultaneously wraps two side surfaces adjacent one side corner of the pouch cup portion C. In addition, when the lower fixing jig 400 is used as described above, there is an advantage that the same lower fixing jig 400 may be used continuously by changing only the position or angle even if the other corner height of the pouch cup portion C is measured.

In addition, as shown in FIG. 7, the lower fixing jig 400 may include an inclined surface 420 formed on each of the wing portions that abut against the pouch cup portion C. As shown in FIG. 7, the inclined surface 420 formed on each of the wing portions may have a form that is lowered toward the pouch cup portion C and thus approaches the bottom surface (or the pouch wing portion). Since this corresponds to a taper design considering an entry angle and reflection angle of the laser emitted from the 3D shape measurer (i.e., considering that the laser emitted from the 3D shape measurer enters or is reflected through the inclined surface 420), if possible, it is preferable to form the inclined surface 420 on the lower fixing jig 400.

Also, to accurately measure the height of the pouch cup portion C, the laser of the 3D shape measurer needs to be emitted in a state that is not interfered by obstacles. Accordingly, it is preferable that the upper fixing jig 300 is not positioned at the corner end of the pouch cup portion C so that the laser of the 3D shape measurer can enter normally (in other words, so that the measuring part is exposed). That is, it is preferable that the upper fixing jig 300 includes a recessed portion recessed into the corner portion of the pouch cup portion C so that the laser of the 3D shape measurer can enter or the measuring portion is exposed. FIG. 7 shows as an embodiment a state in which one end of the upper fixing jig 300 located on the side of the measuring part is recessed inward or rounded to expose the measuring part, and in addition to this, it is naturally to expose the measuring portion through various shapes.

As with the upper fixing jig 300, the lower fixing jig 400 should not interfere with the laser emission of the 3D shape measurer. As a result, it is preferable that the lower fixing jig 400 is not also positioned at a portion facing the corner of the pouch cup portion C so that the laser of the 3D shape measurer can enter normally (in other words, so that the measuring part is exposed). In other words, it is preferable that a bottom exposure portion 430 for exposing the bottom is further formed in a recessed shape at a bent portion that abuts against the pouch cup portion C. FIG. 7 shows, as an embodiment, an aspect in which the bottom exposure portion 430 that exposes the bottom is formed in a recessed shape at the bent portion that abuts against the pouch cup portion C in the ']'-shaped lower fifing jig 400 to expose the measuring portion, and in addition to this, it is natural that the measuring portion can be exposed through various recessed shapes. At this time, the bottom exposed part 430 may be formed in a shape symmetrical to the shape of the lower fixing jig 400 (for example, a letter 'L' shape) based on both vertices of the lower fixing jig 400, but is not limited thereto. In addition, this design is also a design considering the entry angle and reflection angle of the laser emitted from the 3D shape measurer.

If all of the above design requirements are satisfied, it is possible to measure the cup portion height h of the corner portion exposed by the upper fixing jig 300 and the lower fixing jig 400 through the 3D shape measurer. FIG. 8 is an image in which a plurality of profile measurement lines are set in the direction from the corner side of the cup portion of the upper fixing jig to the side of the lower fixing jig through the captured image obtained through the laser emitted by the 3D shape measurer and the camera of the 3D shape measurer. Specifically, first, the captured image obtained through the laser emitted by the 3D shape measurer and the camera of the 3D shape measurer is acquired. Subsequently, as shown in FIG. 8, a plurality of profile measurement lines are set in the direction from the corner side of the cup portion of the upper fixing jig 300 to the lower fixing jig 400 through the captured image obtained, and the height value of the pouch cup portion C may be obtained by calculating a difference between the highest point and the lowest point on the basis of an average value thereof (based on the average value of multiple points considering the possibility that errors and deviations may occur when measuring based on a local point). For example, the profile measurement lines may be set to a total of five, and an interval between the measurement lines may be 0.25 mm, but since this is only an embodiment, it should not be construed as limiting thereto.

When the cup portion height h of the corner portion exposed by the upper fixing jig 300 and the lower fixing jig 400 is measured through the above, the measured value may be macro-calculated to determine the height h of the pouch cup portion C. The macro calculation may be performed through a macro program reproduced under the same conditions as the pouch cup portion measurement design criteria of the present invention, and may be performed within the 3D shape measurer or through a separately provided device.

Next, a height measuring apparatus of the pouch cup portion according to the present invention will be described. Referring to FIGS. 3, 4 and 7, the height measuring apparatus of the pouch cup portion according to the present invention is an apparatus for measuring the height of the pouch cup portion C of the pouch case for a secondary battery, which includes a cup portion support jig 100 having an internal shape of the pouch cup portion C so that the cup portion C of the pouch can be covered, a plate-shaped upper fixing jig 300 which exposes a corner portion for measuring the height of the cup portion C is exposed on the upper surface of the pouch 200 that is covered on the cup portion support jig 100 and covers a peripheral portion of the exposed corner portion, a plate-shaped lower fixing jig 400 that covers the pouch wing portion W of the lower corner portion corresponding to the corner portion and the periphery bottom portion, and exposes the periphery of the lower corner portion to enable the height measurement of the cup portion C, and a 3D shape measurer that measures the height of the corner portion.

Referring to FIG. 5, the cup portion support jig 100 may be provided on a separate pedestal 110. A hole may be formed in each of the cup portion support jig 100 and the pedestal 110, and the cup portion support jig 100 and the pedestal 110 may be fastened and fixed to each other through the hole by a member such as a screw or pin. At this time, the pedestal 110 may be placed on the die, and if necessary, members such as screws and pins can pass through the die to further improve the fixing force. Also, both the cup portion support jig 100 and the pedestal 110 can be provided with a magnet, and the other is made of a material such as steel to which the magnet can be attached and thus attached and fixed to each other.

In addition, it is preferable that the cup portion support jig 100 and the pedestal 110 are installed to be fixed to each other in alignment with the camera center point of the 3D shape measurer or the measuring point. This is because, even if the pouch 200 or the cup portion support jig 100 is rotated by 90 degrees, 180 degrees or 270 degrees on the pedestal 110, the height h of the cup portion C can be immediately measured without moving the pedestal 110 to X and Y axes. Moreover, as shown in FIG. 6, the two cup portion support jigs 100 may be positioned side by side over the pedestal 110. This is a case for measuring the height of the cup portion of the model in which the pouch is formed with two cup portions, which is to compensate for the problem in that the pouch or the cup portion support fixing jig 100 cannot be rotated by 90 degrees, 180 degrees, or 270 degrees on the pedestal 110 because the pouch model formed with two cup portions has specification greater than those of the pouch model formed with one cup portion. Also, when there is a difference between the height of the cup portion C of the molded pouch 200 and the height of the cup portion support jig 100, a height adjusting liner plate (not shown) may be inserted to face the upper surface or the lower surface of the cup portion support jig 100. Holes that can be formed in the cup portion support jig 100 and the pedestal 110 may also be formed in the height adjusting liner plate, and mutual fastening is possible using members such as screws and pins. Further, fixing using magnetic force is also possible.

Referring to FIG. 7, the upper fixing jig 300 is preferably positioned as close as possible to one side corner of the pouch cup portion C to be measured, and the lower fixing jig 400 is preferably positioned so that the two wing portions simultaneously wrap the two side surfaces adjacent to the one side corner of the pouch cup portion C (that is, the lower fixing jig 400 includes two wing portions that simultaneously wrap the two side surfaces adjacent to one side corner of the pouch cup portion C). Further, in the lower fixing jig 400, each of the wing portions that abut against the pouch cup portion C may be formed with an inclined surface as shown in FIG. 7. Further, as shown in FIG. 7, the inclined surface formed on each of the wing portions may have a shape that descends toward the side of the pouch cup portion C and approaches the bottom surface (or the pouch wing portion).

In addition, it is preferable that the upper fixing jig 300 is not positioned at the corner end of the pouch cup portion C so that the laser of the 3D shape measurer can enter normally (in other words, so that the measuring part is exposed). That is, it is preferable that the upper fixing jig 300 includes a recessed portion recessed into the corner portion of the pouch cup portion C so that the laser of the 3D shape measurer can enter or the measuring part is exposed. As an embodiment, FIG. 7 shows an aspect in which one end of the upper fixing jig 300 located on the side of the measuring portion is recessed inward or bent to expose the measuring portion, and in addition to this, the measuring portion may be exposed through various shapes.

Also, the lower fixing jig 400 is preferably not positioned at the portion that faces the corner of the pouch cup portion C so that the laser of the 3D shape measurer can enter normally (in other words, so that the measuring part is exposed). In other words, a bottom exposure portion 430 for exposing the bottom may be formed in a recessed shape at the bent portion of the lower fixing jig 400 that abuts against the pouch cup portion C. FIG. 7 shows an aspect in which, as an embodiment, a bottom exposure portion 430 for exposing the bottom is formed in a recessed shape at the bent portion that abuts against the pouch cup portion C in the lower fixing jig 400 in a letter '┐' shape to expose the measuring part, and in addition to this, the measuring part can be exposed through various shapes. In this case, the bottom exposure portion 430 may be formed in a shape symmetrical to the shape of the lower fixing jig 400 (for example, a letter 'ㄴ' shape) based on both vertices of the lower fixing jig 400, but is not limited thereto.

Further, as described above, each of the upper fixing jig 300 and the lower fixing jig 400 may be fixed by magnetic force or the like. In addition, the upper fixing jig 300 and the lower fixing jig 400 preferably have a color with a brightness of 5 or less to reduce reflection of the laser emitted by the 3D shape measurer. As the color having a lightness of 5 or less, black or a color close thereto is preferable.

The 3D shape measurer provides a captured image obtained through a laser and a camera, and when the value of the cup portion height h of the exposed corner is measured through this, the measured value can be macro-calculated to determine the height h of the pouch cup portion C. The macro calculation may be performed through a macro program reproduced under the same conditions as the pouch cup portion measurement design criteria of the present invention, and this may be performed within the 3D shape measurer or through a separately provided device.

A method and apparatus for measuring a height of a pouch cup portion that accommodates an electrode assembly according to the present invention have been described above with reference to specific embodiments, but the present invention is not limited thereto and various modifications can, of course, be made within the scope and technical idea of the present invention.

DESCRIPTION OF SYMBOLS

90: Stripper
92: Die
94: Punch
100: Cup portion support jig
110: Pedestal
200: Pouch (C: cup portion of pouch, W: wing portion of pouch)
300: Upper fixing jig
310: Upper fixing jig knob
400: Lower fixing jig (420: inclined surface, 430: bottom exposure portion)
410: Lower fixing jig knob

The invention claimed is:

1. A method for measuring a height of a pouch cup portion of a pouch case for a secondary battery, the method comprising:
  (a) covering a cup portion support jig with a pouch;
  (b) positioning an upper fixing jig exposing a corner portion of the pouch for measurement of a height of the cup portion at a pouch upper surface covering the cup portion support jig, the upper fixing jig covering a periphery of the exposed corner;
  (c) positioning a lower fixing jig at a pouch wing portion and a peripheral bottom portion of a lower corner portion of the pouch underlying the corner portion of the pouch, the lower fixing jig exposing a periphery of the lower corner portion and covering other portions of the pouch; and
  (d) measuring the height of the pouch cup portion at the corner portion exposed by the upper fixing jig and at the lower corner portion of the pouch exposed by the lower fixing jig using a 3D shape measurer.

2. The method according to claim 1, wherein after the measurement of the height of the pouch cup portion of any one corner portion of the pouch is completed, the height of the cup portions of three remaining corner portions is sequentially measured.

3. The method according to claim 2, wherein after the measurement of the height of the pouch cup portion of the any one corner portion of the pouch is completed, the pouch or the cup portion support jig is rotated by 90 degrees, 180 degrees or 270 degrees to measure the height of another corner portion of the cup portion, and the another corner portion is a corner in a height direction that connects one vertex and a vertex facing the vertex.

4. The method according to claim 3, wherein the cup portion support jig is provided on a separate pedestal from the upper fixing jig and from the lower fixing jig, and after the cup portion support jig is rotated relative to the pedestal by 90 degrees, 180 degrees or 270 degrees, the cup portion support jig is fastened to the pedestal by a screw member or a pin member, or is attached to the pedestal using magnetic force coupling, and the height of the pouch cup portion at each corner portion is sequentially measured while turning the pouch or the cup portion support jig.

5. The method according to claim 4, wherein when there is a difference between the cup portion height of the pouch and the height of the cup portion support jig, a height adjusting liner plate is coupled to the cup portion support jig facing an upper surface or a lower surface of the cup portion support jig to measure the height of the pouch cup portion, and the height adjusting liner plate is fastened to the cup portion support jig and the pedestal with a screw member or a pin member, or is attached to the cup portion support jig by magnetic force.

6. The method according to claim 2, wherein after the measurement of the height of the pouch cup portion of the any one corner portion of the pouch is completed, the 3D shape measurer is positioned on the another corner portion of the cup portion to measure the height of the another corner portion.

7. The method according to claim 1, wherein after the height of the pouch cup portion at the corner portion is measured by the 3D shape measurer, the measured value is macro-calculated to determine the height of the pouch cup portion.

8. The method according to claim 1, wherein the upper fixing jig and the lower fixing jig have a color having a brightness of 5 or less.

9. The method according to claim 1, wherein each of the upper fixing jig and the lower fixing jig fixes the pouch using magnetic force.

10. The method according to claim 1, wherein the pouch has two cup portions formed therein, a part of the cup portion support jig is accommodated in each of the two cup portions, and the height of the corner portion in which the two parts of the cup portion support jig face each other are measured without rotating the pouch or the cup portion support jig.

11. The method according to claim 1, wherein the upper fixing jig is in close contact with one side corner of the pouch cup portion to be measured, and the lower fixing jig simultaneously wraps two side surfaces adjacent to the one side corner of the pouch cup portion.

12. The method according to claim 11, wherein the lower fixing jig comprises two wing portions that simultaneously wrap the two side surfaces adjacent to the one side corner of the pouch cup portion, each of the wing portions includes an inclined surface that descends toward a side of the pouch cup portion, and a laser emitted from the 3D shape measurer enters the pouch cup portion or is reflected through the inclined surface into the pouch cup portion.

13. The method according to claim 11, wherein the upper fixing jig includes a recess that is recessed inward at the corner portion of the pouch cup portion so that a laser of the 3D shape measurer enters the recess.

14. The method according to claim 11, wherein a bottom exposure portion of the lower fixing jig has a recessed shape at a bent portion of the lower fixing jig that abuts against the pouch cup portion during the positioning of the lower fixing jig, so that a laser of the 3D shape measurer enters the recessed shape.

15. The method according to claim 1, wherein a captured image obtained by a laser emitted by the 3D shape measurer and a camera of the 3D shape measurer is acquired, a plurality of profile measurement lines are applied to the acquired captured image, and the height of the pouch cup portion is obtained by calculating a difference between a highest point and a lowest point of the pouch cup portion based on an average value thereof.

16. An apparatus for measuring a height of a pouch cup portion of a pouch case for a secondary battery, the apparatus comprising:
a cup portion support jig having a shape conforming to an internal shape of the pouch cup portion;
a plate-shaped upper fixing jig which is configured to expose a corner portion of the pouch cup portion for measuring of the height of the cup portion, the upper fixing jig configured to receive an upper surface of the pouch covered thereon, and the upper fixing jig configured to cover a peripheral portion of the corner portion;
a plate-shaped lower fixing jig that is configured to cover a pouch wing portion and a peripheral bottom portion of a lower corner portion of the pouch cup portion underlying the corner portion, and the lower fixing jig is configured to expose a periphery of the lower corner portion; and
a 3D shape measurer configured to measure the height the pouch cup portion at the corner portion.

17. The apparatus according to claim 16, wherein the lower fixing jig comprises two wing portions that are configured to simultaneously wrap two side surfaces adjacent to one side corner of the pouch cup portion.

18. The apparatus according to claim 17, wherein the lower fixing jig comprises an inclined surface that is formed on each of the wing portions that are configured to abut the pouch cup portion and are configured to descend toward the pouch cup portion.

19. The apparatus according to claim 17, wherein a bottom exposure portion that exposes the bottom is further formed in a recessed shape at a bent portion of the lower fixing jig that abuts against the pouch cup portion;
wherein the bottom exposure portion has a shape that conforms to a shape of the lower fixing jig based on two vertices of the lower fixing jig.

20. The apparatus according to claim 16, wherein the upper fixing jig has a shape configured to cover a periphery of a pouch upper surface of the corner portion, and the upper fixing jig comprises a recess that is recessed inward so that the apparatus is configured to expose the corner portion of the pouch cup portion.

* * * * *